(12) United States Patent
Nyanteh et al.

(10) Patent No.: US 10,262,090 B1
(45) Date of Patent: Apr. 16, 2019

(54) SYSTEM AND METHOD FOR ASSESSING THE REMAINING USEFUL LIFE OF AN INSULATION SYSTEM

(71) Applicant: The Florida State University Research Foundation, Inc., Tallahassee, FL (US)

(72) Inventors: Yaw D. Nyanteh, Tallahassee, FL (US); Lukas Graber, Tallahassee, FL (US); Horatio Rodrigo, Billerica, MA (US); Sanjeev K. Srivastava, Princeton, NJ (US); Chris S. Edrington, Tallahassee, FL (US); David S. Cartes, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 1131 days.

(21) Appl. No.: 14/539,580

(22) Filed: Nov. 12, 2014

Related U.S. Application Data

(60) Provisional application No. 61/902,538, filed on Nov. 11, 2013.

(51) Int. Cl.
G06G 7/62 (2006.01)
G06F 17/50 (2006.01)

(52) U.S. Cl.
CPC ................. G06F 17/5036 (2013.01)

(58) Field of Classification Search
CPC .................................... G06F 17/5036
See application file for complete search history.

(56) References Cited

PUBLICATIONS

Nyanteh et al. "Overview of Simulation Models for Partial Discharge and Electrical Treeing to Determine Feasibility for Estimation of Remaining Life of Machine Insulation Systems," Electrical Insulation Conference, Jun. 2011, 6 pages. (Year: 2011).*
Malinovski et al. "Simulation of Partial Discharge and Electrical tree growth in solid insulation under voltage," IEEE, 4 pages, Jun. 25, 1998. (Year: 1998).*
Champion et al. "Simulation of Partial Discharges in Conducting and Non-Conducting Electrical Tree Structures," Journal of Physics , 9 pages, 2001. (Year: 2001).*
Bartinkas. Partial Discharges. Their Mechanism, Detection and Measurement. IEEE Transactions on Dielectrics and Electrical Insulation. 2002. vol. 9 (No. 5): 763-808.
Brutsch and Chapman. Insulating Systems for High Voltage Rotating Machines and reliability Considerations. Conference Record of the 2010 IEEE International Symposium on Electrical Insulation. 2010: 1-5.

(Continued)

*Primary Examiner* — S. Sough
*Assistant Examiner* — Carina Yun
(74) *Attorney, Agent, or Firm* — Eversheds Sutherland (US) LLP

(57) ABSTRACT

A system and method for electrical tree simulation based on a modification of a discharge avalanche model with an application of a charge simulation method to determine partial discharge data during the growth of electrical trees in an insulation system and a method of using the model to determine the remaining useful life of an insulation system.

20 Claims, 14 Drawing Sheets

(56) References Cited

PUBLICATIONS

Illias et al., Modelling of partial discharge activity in different spherical cavity sizes and locations within a dielectric insulation material. Proceedings of the 9th International Conference on Properties and Applications of Dielectric Material. 2009: 485-488.

Illias et al., Measurement and modelling of partial discharge behaviour in a spherical cavity within a solid dielectric material as a function of applied voltage amplitude. International Conference on High Voltage Engineering and Application Engineering and Application. 2010: 441-444.

Illias et al., Modelling of temporal temperature and pressure change due to partial discharge events within a spherical cavity in a solid dielectric material using finite element analysis. 2010: 501-504.

Illias et al., Modeling of partial discharge activity in spherical cavities within a dielectric material. IEEE Electrical Insulation Magazine. 2011. vol. 27 (No. 1): 38-453.

Eleftherion. Partial discharge. XXI. Acoustic emission based PD source location in transformers. IEEE Electrical Insulation Magazine. 1995. vol. 11 (No. 6): 22-26.

Sikorski et al., Location of partial discharge sources in power transformers based on advanced auscultatory technique. IEEE Transaction on Dielectrics and Electrical Insulation. 2012. vol. 19 (No. 6): 1948-1956.

Lin. The location of partial discharge sources in power cables: an on-line, low-cost solution. 2008 International Conference on Condition Monitoring and Diagnosis. 2008: 1236-1241.

Zhou et al., Partial Discharge Sources Detection and Location with an Electromagnetic Vector Sensor. IEEE Conference on Industrial Electronics Applications. 2006: 24-26.

Zhong et al., Characterization of partial discharge signals. IEEE/ASME International Conferences on Mechatronics and Embedded Systems and Applications: 392-397.

Cui et al., A Novel Method of Selecting Complex Wavelet for Feature Extraction in Partial Discharge Signal Processing. Congress on Image and Signal Processing. 2008: 128-131.

Luo et al., Efficiency improvement for data-processing of partial discharge signals using parallel computing. International Conference on Solid Dielectrics. 2010. Potsdam, Germany: 1-4.

Zhang et al., Application of signal processing techniques to on-line partial discharge detection in cables. International Conference on Power System Technology. 2004. 1780-1785.

Shim et al., Digital signal processing applied to the detection of partial discharge: an overview. IEEE Electrical Insulation Magazine. 2000. vol. 16 (Issue 13): 6-12.

Qu. Application of digital signal processing techniques for noise suppression in partial discharge measurements. Proceedings of the 4th International Conference on Properties and Applications of Dielectric Materials. Jul. 1994. vol. 2: 602-605.

Buchalla et al., Digital signal processing methods for interference recognition in partial discharge measurement—a comparison. IEEE International Symposium on Electrical Insulation. Jun. 1996. vol. 1: 393-396.

Rubio-Serrano et al., Instrumentation system and digital signal processing for studying the characteristics of the acoustic and electrical signals generated by partial discharges. IEEE International Conference Industrial Technology (ICIT). 2012: 573-578.

Sahoo et al., Trends in partial discharge pattern classification: a survey. IEEE Transactions on Dielectrics and Electrical Insulation. Apr. 2005. vol. 2 (Issue 2): 248-264.

Koo et al., Identification of insulation defects in gas-insulated switchgear by chaotic analysis of partial discharge. IET Science, Measurement, and Technology. 2010. vol. 4 (Issue 3): 115-124.

Rui-jin et al., Aging condition assessment of transformer oil-paper insulation model based on partial discharge analysis. IEEE Transactions on Dielectrics and Electrical Insulation. 2011. vol. 18 (Issue 1): 303-311.

Ma et al., DSP based partial discharge characterisation by wavelet analysis. Proceedings of the XIXth International Symposium on Discharge and Electrical Insulation in Vacuum. 2000. vol. 2: 780-783.

Dissado and Sweeney. An analytical model for discharge generated breakdown structures. Proceedings of the 4th International Conference on Conduction and Breakdown in Solid Dielectrics. 1992: 328-332.

Nyanteh et al., Determination of remaining life of rotating machines in Shipboard Power Systems by modeling of dielectric breakdown mechanisms. Electric Ship Technologies Symposium. 2013: 49-54.

Champion and Dodd. An approach to the modelling of partial discharges in electrical trees. J. Phys. D: appl. Phys. 1998. vol. 31: 2305-2315.

Noskov et al., Modelling of partial discharge development in electrical tree channels. IEEE Transactions on Dielectrics and Electrical Insulation. Jun. 2003. vol. 10 (No. 3): 425-434.

Noskov et al., Measurement and simulation of electrical tree growth and partial discharge of activity in epoxy resin. J. Phys. D: Appl. Phys. 2001. vol. 34: 1389-1398.

Okubo et al., V-t characteristics of partial discharge inception in liquid nitrogen/ PPLP® composite insulation system for HTS cable. IEEE Transactions on Dielectrics and Electrical Insulation. Dec. 2002. vol. 9 (Issue 6): 945-951.

Ding et al., Thermodynamic model for electrical tree propagation kinetics in combined electrical and mechanical stresses. IEEE Transactions on Dielectrics and Electrical Insulation. Feb. 2005. vol. 12 (No. 1): 91-89.

Dissado et al., Propagation of electrical tree structures in solid polymeric insulation. IEEE Transactions on Dielectrics and Electrical Insulation. Jun. 1997. vol. 4 (Issue 3): 259-279.

Dissado. Understanding electrical trees in solids: from experiment to theory. IEEE Transactions on Dielectrics and Electrical Insulation. Aug. 2002. vol. 9 (No. 4): 483-497.

\* cited by examiner

SYSTEM AND METHOD FOR ASSESSING THE REMAINING USEFUL LIFE OF AN INSULATION SYSTEM

CROSS-REFERENCE TO RELATED APPLICATIONS

This invention claims priority to currently U.S. Provisional Patent Application No. 61/902,538 filed on Nov. 11, 2013 and entitled "Method for Assessing the Remaining Life of Electrical Machine Insulation", the contents of which are incorporated herein by reference.

FEDERALLY SPONSORED RESEARCH OR DEVELOPMENT

This invention was made with Government support under Grant No. N00014-02-1-0623 awarded by the Office of Naval Research. The government has certain rights in the invention.

FIELD OF THE INVENTION

This invention relates, generally, to the analysis of electrical machine insulation systems. More specifically, it relates to the determination of the remaining useful life of electrical machine insulation systems.

BACKGROUND OF THE INVENTION

In the field of electrical engineering, a partial discharge (PD) is a localized dielectric breakdown of a portion of a solid or fluid electrical insulation system subjected to a high voltage stress. When the electrical insulation system breaks down, electrical discharges are emitted in a tree like pattern within the insulation, commonly referred to as an electrical tree. Electrical treeing in dielectric insulation is a damaging process due to the partial discharge and to the progression of the partial discharge throughout the stressed dielectric insulation. Once initiated, partial discharge (PD) causes progressive deterioration of the insulating material, ultimately leading to electrical breakdown of the system. The effects of partial discharge within high voltage cables and equipment, if not detected and corrected, can ultimately leading to complete failure of the system. As such, partial discharge prevention and detection are essential to ensure reliable, long-term operation of high voltage equipment.

By measuring the partial discharge occurring within the dielectric insulation, the overall dielectric condition of high voltage equipment can be evaluated and electrical treeing in the insulation can be detected and located. The use of partial discharge measurement systems is especially important for shipboard power systems, and particularly for all-electric ships, where partial discharge within the dielectric insulation is presumed to be a major source of degradation of the system as a result of the unique operating circumstances generally experienced onboard a ship.

Various partial discharge detection and measurement methods are known in the art. The methods and devices currently known in the art monitor the partial discharge associated with insulation of electrical machines and provide warning signals when the partial discharge activity within the insulation exceeds a predetermined threshold. However, the current state of the art devices are only capable of monitoring the current condition of the machine insulation and are incapable of determining the remaining useful life of the machine insulation system.

Accordingly, what is needed is a more accurate and more complete electrical tree simulation model coupled with a method for determining the extent of damage and remaining life of a machine insulation system. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The present invention provides a more accurate and more complete electrical tree simulation model and a method for determining the extent of damage and the remaining useful life of a machine insulation system.

In accordance with the present invention, a method for the simulation of an electrical tree representative of partial discharge events within an insulation system is provided. In a simplified implementation of the method, the potential electrical tree within an insulation system, is represented by a plurality of charged spheres and a plurality of potential tree links between any two of the plurality of charged spheres based on the Charge Simulation Method (CSM). In a more general implementation, Maxwell's equations can be used to calculate the electric field at each point in the dielectric material. The method further includes, applying a voltage to the insulation system at a tree inception point, calculating an incremental damage energy across each of the plurality of potential tree links resulting from the application of the voltage to the insulation system, accumulating the incremental damage energy across each of the plurality of potential tree links and identifying a potential tree link of the plurality of potential tree links as a failed tree link if the accumulated incremental damage energy exceeds a critical damage energy level. After a failed tree link has been identified, the method further includes, adding the failed tree link to the tree inception point to simulate the electrical tree.

In an additional embodiment, a method for predicting a time-to-breakdown of an insulation system is provided. The method includes, representing a potential electrical tree within an insulation system, the potential electrical tree comprising a plurality of charged spheres and a plurality of potential tree links between any two of the plurality of charged spheres. The method further includes, applying a voltage to the insulation system at a tree inception point, calculating an incremental damage energy across each of the plurality of potential tree links resulting from the application of the voltage to the insulation system, accumulating the incremental damage energy across each of the plurality of potential tree links and identifying a potential tree link of the plurality of potential tree links as a failed tree link if the accumulated incremental damage energy exceeds a critical damage energy level. After a failed tree link has been identified, the method further includes, adding the failed tree link to the tree inception point to simulate the electrical tree. The method further includes, calculating a partial discharge based at least in part on the accumulated damage energy, obtaining a fractal dimension of the electrical tree and predicting the time-to-breakdown of the insulation system based at least in part upon the fractal dimension of the electrical tree and calculated partial discharge.

In an additional embodiment, the method of the present invention may be implemented as one or more non-transitory computer-readable media having computer-executable instructions for performing a method of running a software program on a computing device for the simulation of an electrical tree representative of partial discharge events within an insulation system and for the identification of the time-to-breakdown of the insulation system.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the invention, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The present invention provides a more accurate and more complete electrical tree simulation model and a method for determining the extent of damage and the remaining useful life of a machine insulation system.

The method of the present invention establishes a simulation method determine the extent of damage in electrical machine insulation systems that is more accurate than existing methods currently known in the art and is capable of determining the remaining life of electrical machine insulation systems. The simulation model of the present invention is also more accurate and accounts for more aspects of the insulation breakdown process than currently existing models.

Figure 1:
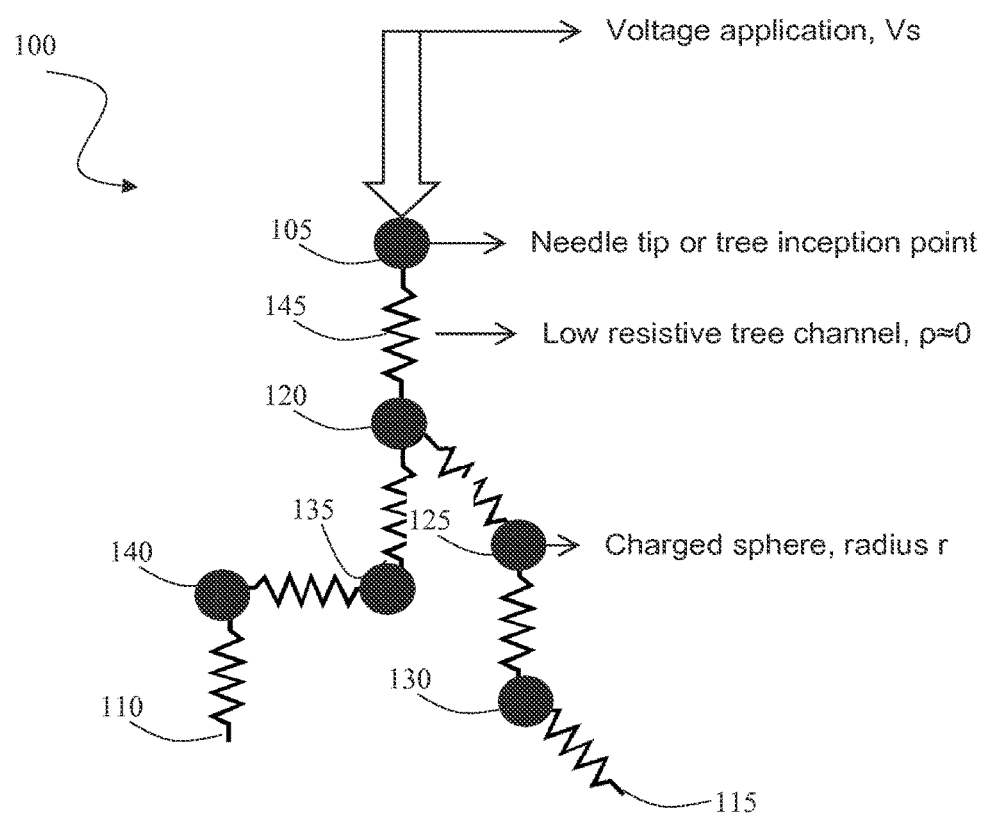
FIG. 1 is an illustration of an electrical tree model in accordance with an embodiment of the present invention.

With reference to FIG. 1, the proposed dielectric breakdown model of the present invention represents the electrical tree 100 within the dielectric insulation as a highly conductive path from the tree inception point 105 to any tree tip 110, 115. Also shown, with reference to FIG. 1, are a plurality of darkened circles representing charged spheres 120, 125, 130, 135, 140 that are imagined to be interspersed and contiguous within the electrical tree 100. By calculating the voltages and charges between the charged spheres 120, 125, 130, 135, 140 and all points of possible tree extensions, the electrical tree 100 can be advanced from the tree inception point 105 to the ground plane. In a specific embodiment of the invention, the number of points of possible tree extensions is limited to 5 as a compromise between computational effort and accuracy of representation of the electrical tree 100.

In accordance with the present invention, the calculation of charges on each of the charged spheres 120, 125, 130, 135, 140 within the electrical tree 100, including the charged sphere 105 at the tree inception point, is based on the Charge Simulation Method (CSM), which uses image charges to account for the ground electrode plane. In accordance with the charge simulation method, the charge on each sphere 105, 120, 125, 130, 135, 140 is calculated by the superposition principle to reflect the voltages at each point in the dielectric material. Tree growth is based on the Discharge Avalanche Model (DAM) model by the accumulation of damage energy in the specified direction. For simplicity, the damage energy is assumed to be proportional to the electric field in the specified path direction and is given in Equation (1) below, where D(E) is the damage energy calculated for an electric field E, α is the constant of proportionality associated with Equation (1), and V(x) is the potential at location x with units of joule-meter per volts.

$$D(E) = \alpha(V(x_1) - V(x_2)) \quad (1)$$

The damage energy is calculated and accumulated until it reaches a predetermined critical damage energy level, at which time it is assumed that a local breakdown of the dielectric insulation as occurred and a new charged sphere is added to the tree to represent a tree link, such as tree link 145, in the electrical tree 100. When there is a local failure of the dielectric material, voltage between the points of failure are modified to account for the breakdown. This modification is carried out by assuming a simple model of low resistance path between the points of failure as shown in FIG. 1.

Figure 2:
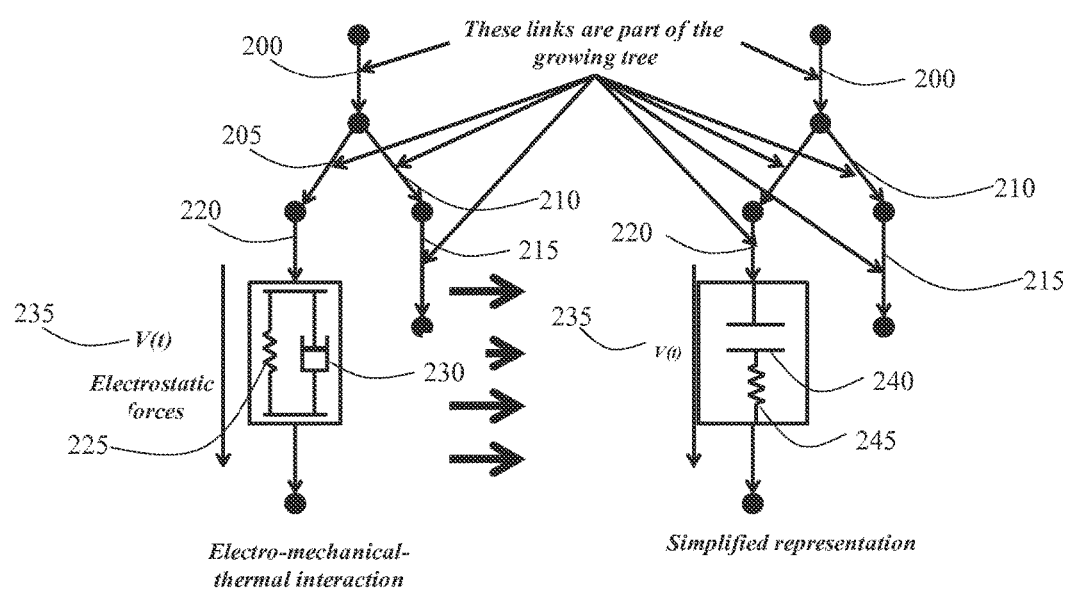
FIG. 2 is a diagram illustrating an electromechanical breakdown model for the simulation of the electrical tree in accordance with an embodiment of the present invention.

When dielectric materials are subjected to high electric fields, the electrostatic compressive forces can cause failure if they exceed the mechanical compression limits of the dielectric material. This idea is assumed to take place across each tree link. The idea of the breakdown model is to utilize an electromechanical analog, as show in FIG. 2, to describe the tree links. FIG. 2 illustrates the energy considerations related to the partial discharge events. In this analysis, the thermal interactions are discounted, since the testing was carried out at a fairly constant temperature. With reference to FIG. 2, each tree link 200, 205, 210, 215, 220 in the dielectric material, when subjected to an electrostatic force 235, can be considered as a spring 225 and a damper 230 system that can be replaced by an analogous capacitor 240 and resistor 245. The model assumes that prior to the application of the voltage the dielectric material is at its lowest energy configuration. The distribution of the field inside the dielectric material is then obtained and used to calculate the amount of energy each point in the dielectric material has increased by. At another point in time if the applied voltage is increased, the damage energy is calculated again and added to the potential energy at each point of the dielectric material. Each point in the dielectric material, however, reacts in opposition to increased potential energy and this can be calculated at each point. The idea behind this calculation is that when a new field applied, the amount of damage energy it can impress upon any point in the dielectric material would depend on how much larger the field is than the reaction at the point due to its increased potential energy. When the amount of damage at that point increases beyond the maximum possible, the dielectric material is said to have undergone failure and a tree is said to have started to grow at that point. To describe this process mathematically, it is considered that the conductivity is very large at that point. The 'lossy' component of the dielectric constant of the dielectric material also increases to a large value to account for the sudden current displacement inside the material. This is done in such a way as to ensure that Maxwell's equations are satisfied. In particular Ampere's law is manipulated to ensure that at all times, the left hand side of the equation is always zero to satisfy the lack of magnetic fields in the dielectric material. Using the right hand side, the amount of charge displaced and charge density can be calculated each time there is a breakdown. The displacement of charges during PD causes heating in the location of the discharge. This local heating reduces the dielectric strength by an amount based on the heat capacity of the dielectric material and the conductivity of the dielectric.

In a simplified implementation of the model, the charges on each sphere associated with a local breakdown are modified to account for the voltage changes. The charge transfer that occurs during the breakdown process is assumed to be associated with a partial discharge event in this model. To calculate the charge transfer during the partial discharge event associated with the local breakdown, the superposition principle is used to relate the voltage of any two spheres involved in the local breakdown to the charges of all spheres in the tree (including the two spheres involved in the breakdown) as shown in Equation (2).

$$(x_{11} - x_{11}')Q_1 + (x_{12} - x_{12}')Q_2 + \ldots + (x_{1n} - x_{1n}')Q_n = V_1$$
$$(x_{21} - x_{21}')Q_1 + (x_{22} - x_{22}')Q_2 + \ldots + (x_{2n} - x_{2n}')Q_n = V_2 \quad (2)$$

In Equation (2), $x_{11}$ is the voltage contribution of the sphere with charge $Q_1$, $x_{12}$ is the charge contribution at the point location of charge $Q_1$ due to charge $Q_2$, and $x_{11}'$ is the voltage contribution of the image charge associated with the sphere of charge $Q_1$. The terms $x_1$ and $x_{12}$ in equation (2) are calculated by equations (3) and (4) below, where $d_0$ is the diameter of influence of the charge, r is the distance between the points, $\varepsilon_0$ is the permittivity of free space, and $\varepsilon_r$ is the relative permittivity for the medium.

$$x_{11} = \frac{3}{4\pi\varepsilon_0\varepsilon_r d_0} \quad (3)$$

$$x_{12} = \frac{1}{4\pi\varepsilon_0\varepsilon_r r} \quad (4)$$

The calculation of $x_{11}$ and $x_{12}$ using equations (3) and (4) is performed for all charged spheres added to the tree tip. The voltages after the breakdown process are based on the idea that the physical branch between the tree tip and branch end before breakdown is a highly conductive medium. Equation (2) is then converted into two simple linear equations with two unknowns to be solved during each tree extension. To account for the partial discharge within the tree branches that have already broken down, the electric field between all tree branches are calculated and the tree branch, with the maximum electric field greater than the critical field, is reduced to a value below the critical field. The charge transfer required is solved by using the superposition to obtain two linear equations by similar reasoning as discussed above. After this process is carried out for all tree branches with electric field greater than the critical field, the process is started again with a new instantaneous voltage level. The new instantaneous voltage level is propagated throughout the tree by the assumption of highly conductive tree channels. With the voltages prescribed at each point of the tree, the charges required on each sphere are calculated by similar reasoning based on the superposition of voltages. This results in linear equations which increase in size with each added tree branch. The present invention utilizes a unique approach to obtain accurate solutions at each simulation step by the method of successive relaxation beginning with a single sphere (preferably the sphere at the point of initiation of the tree). A single sphere results in a simple equation that gives the charge required to calculate the voltage at the specified point of the sphere while maintaining all other charges fixed. After obtaining the charge, a second sphere is added to obtain two linear equations with two unknowns and continues until all charges are accounted for.

More generally, Maxwell's equations can be used to calculate the charge transfer using Ampere's law as shown in Equation (5) below. Q is the charge displaced in the dielectric during breakdown.

$$Q = -\int \varepsilon E \, dS \quad (5)$$

With reference to FIG. 2, in one embodiment, the simulation process of the present invention includes, calculating the instantaneous voltage, propagating the voltage throughout the electrical tree and calculating the charge for each sphere 300. Following the calculating of the charge for each sphere, the method further includes, computing the electrical potential across the next available tree link of the electrical tree 305, computing the damage energy for each of the potential tree links and accumulating the damage energy 310. At this point, the partial discharge can be calculated based on the accumulated damage energy 315. After the damage energy has been accumulated, the total damage energy across a potential tree link is assessed to determine if the damage energy is greater than a critical damage energy level 320. If the damage energy of the potential tree link does not exceed the critical damage energy level, then the electric potential of the next available tree link is computed 305. If the damage energy of the potential tree link exceeds the critical damage energy level, the determination is made as to whether or not the potential link is already part of the electrical tree 325. If the potential tree link having a damage energy that exceeds the critical damage energy level is already part of the electrical tree link, then the tree link is thickened 330 and the electrical potential across the next available tree link is computed 305. Alternatively, if the potential tree link having a damage energy that exceeds the critical damage energy level is not currently part of the electrical tree, then the potential tree link is considered a failed tree link and is added to the electrical tree 335. Following the addition of the failed tree link to the electrical tree 335, it is determined whether or not the failed tree link is at the ground plane 340. If the failed tree link is not at the ground plane, then the electric potential across the next available tree link is computed 305. Alternatively, if the failed tree link is at the ground plane, then the simulation is considered completed and the simulation of the electrical ends 350.

Figure 3:
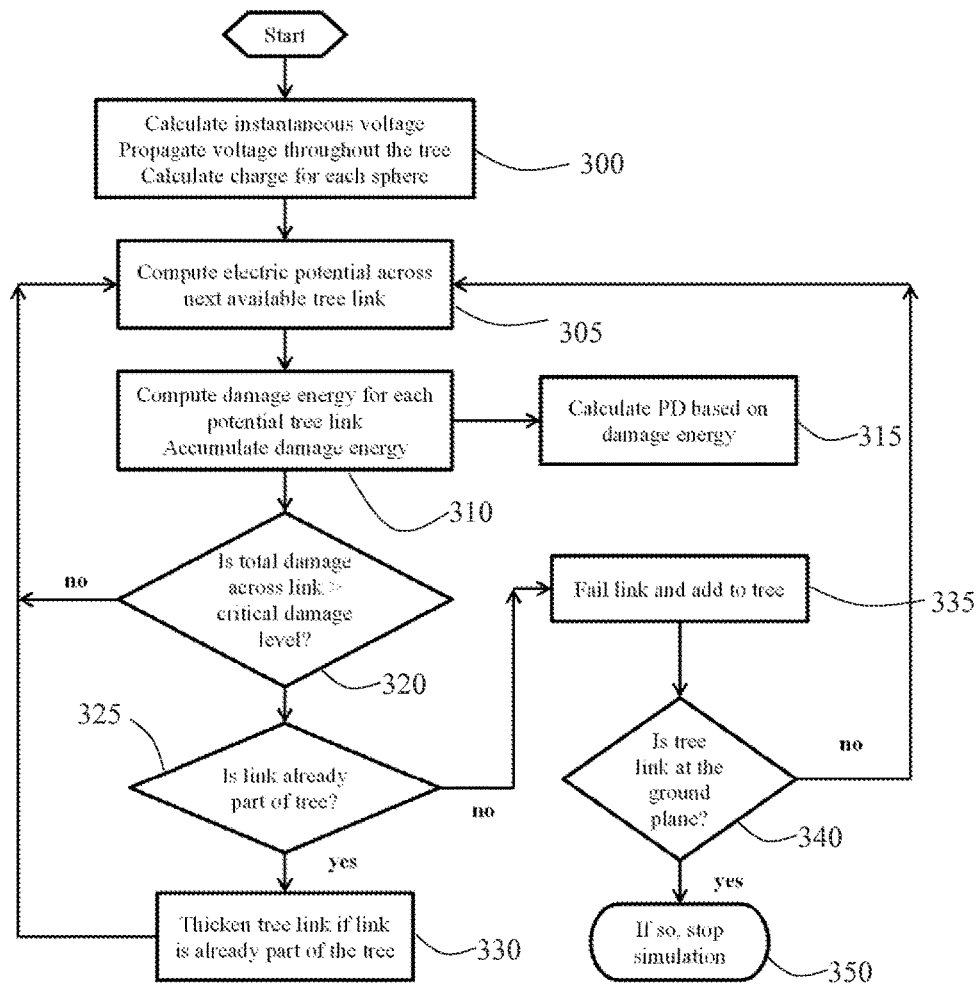
FIG. 3 is a flowchart illustrating the electrical tree simulation process in accordance with an embodiment of the present invention.

Simulations of electrical tree using model illustrated in FIG. 3 have been carried out in MATLAB to assess model assumptions using different values for the model parameters listed below in Table 1.

TABLE 1

| Model Input Parameters | |
| --- | --- |
| Parameter Name | Type of Parameter |
| Applied Voltage | External Input |
| Applied Voltage Frequency | External Input |
| Permittivity of Free Space | Universal Constant |
| Relative Permittivity | Material Constant |
| Material Hardness | Material Constant |
| Critical Damage | Material Property |
| Critical Field | Material Property |
| Channel Conductivity | Material Property |
| Electrode Spacing | Simulation Parameter |

Figure 4:
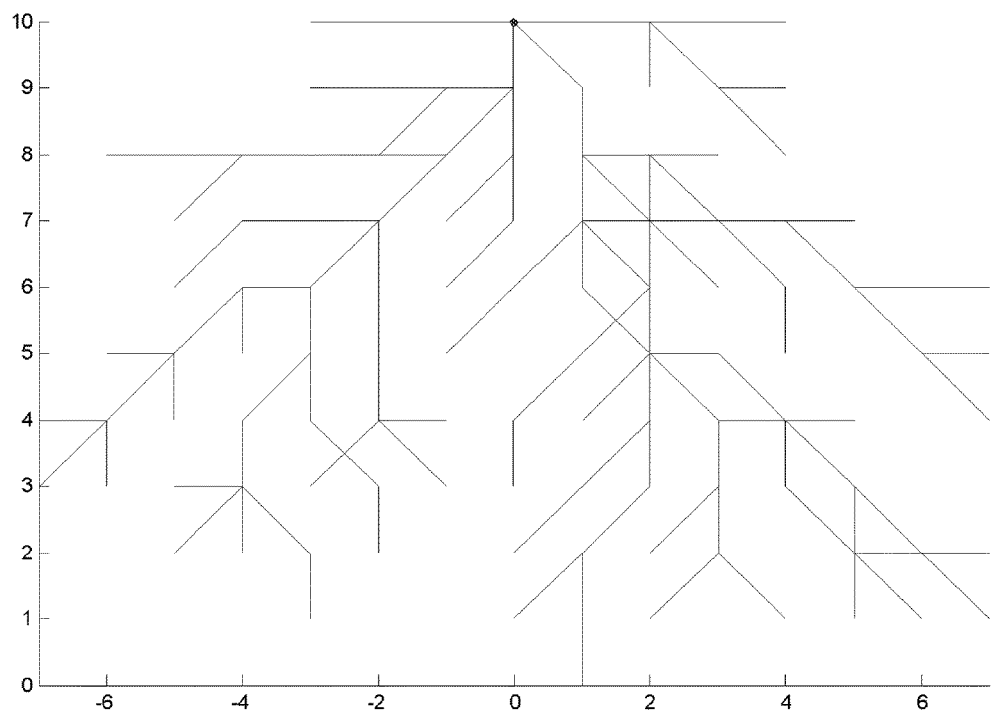
FIG. 4 is a tree simulation at 10 kV for grid spacing of 0.1 mm in accordance with an embodiment of the present invention.
Figure 5:
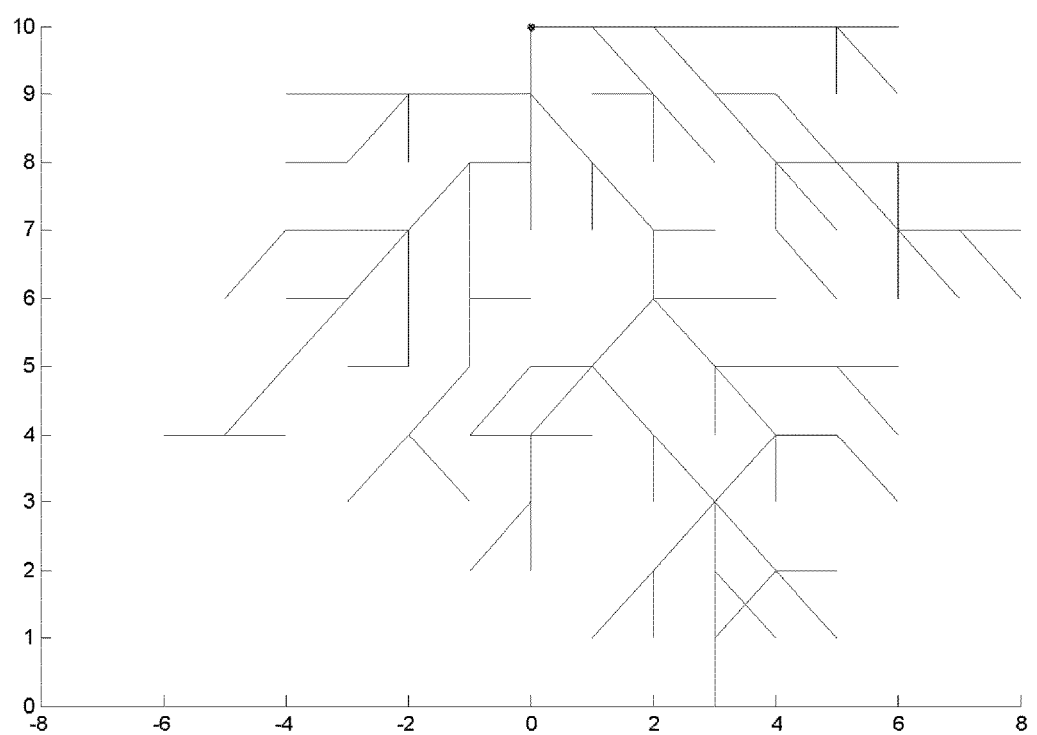
FIG. 5 is a tree simulation at 20 kV for grid spacing of 0.1 mm in accordance with an embodiment of the present invention.
Figure 6:
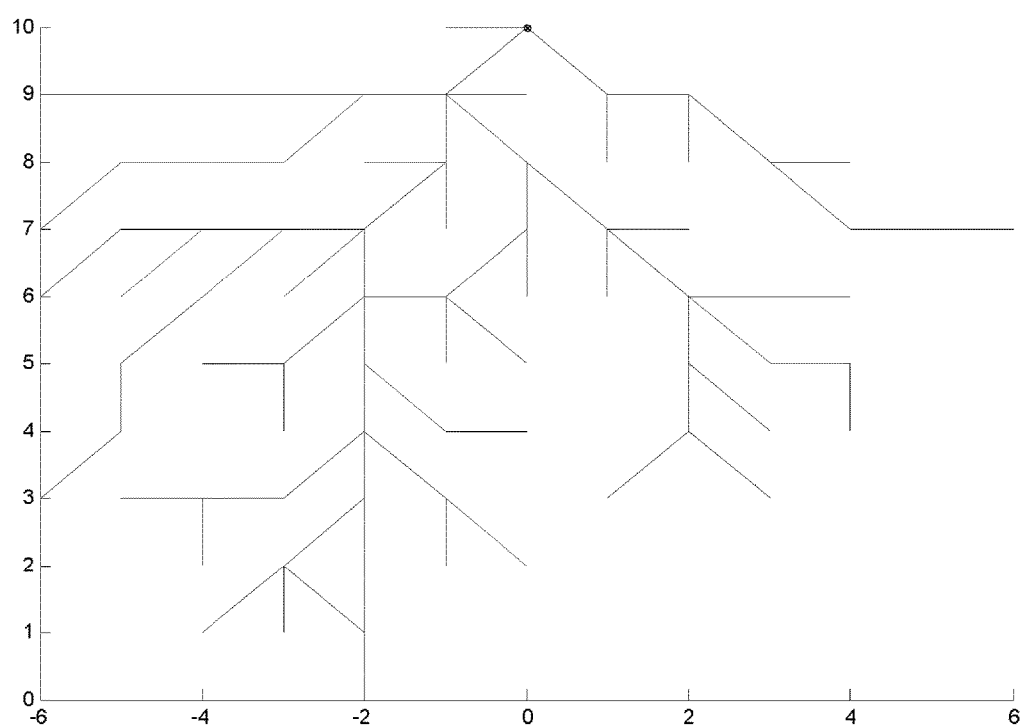
FIG. 6 is a tree simulation at 30 kV for grid spacing of 0.1 mm in accordance with an embodiment of the present invention.
Figure 7:
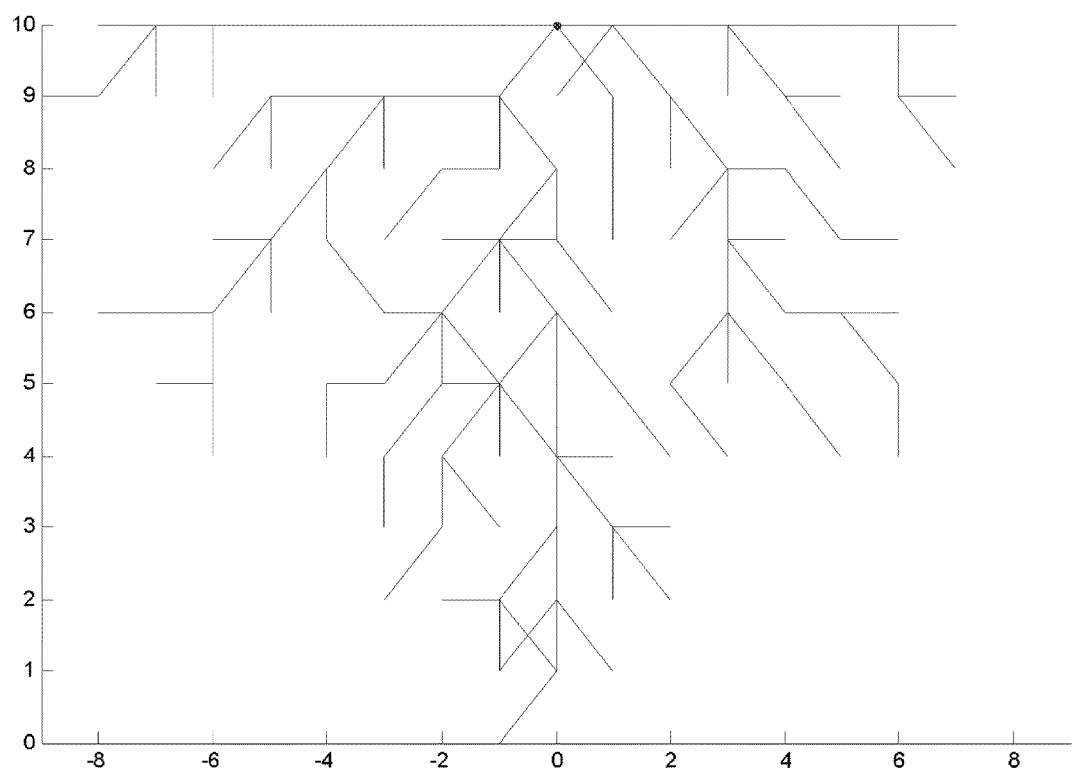
FIG. 7 is a tree simulation at 40 kV for grid spacing of 0.1 mm in accordance with an embodiment of the present invention.
Figure 8:
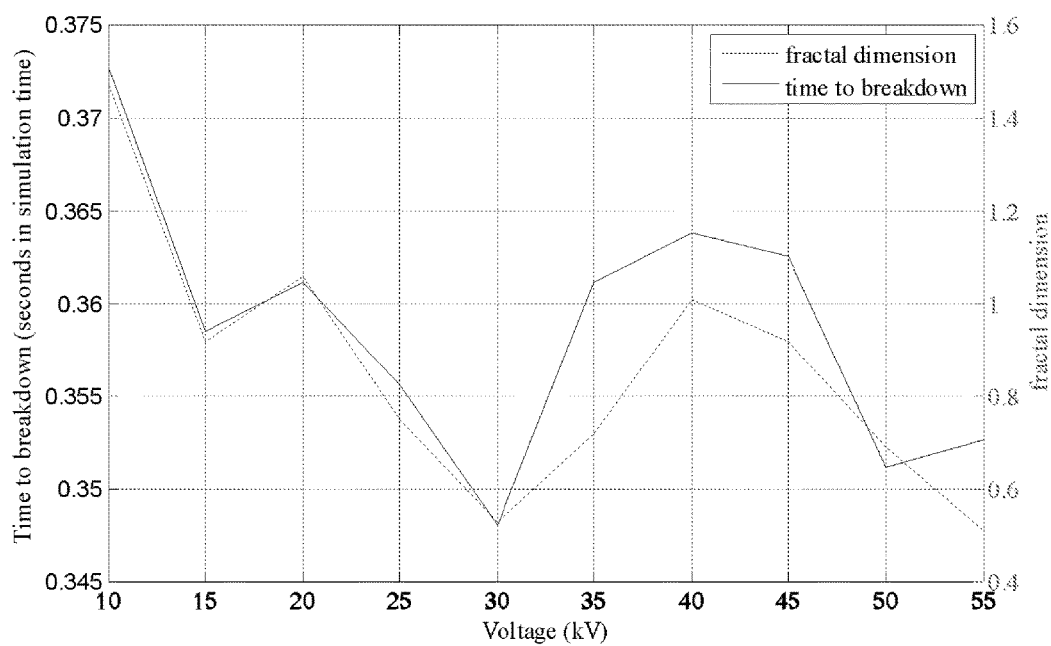
FIG. 8 is a plot of time to breakdown and fractal dimension as a function of applied voltage in accordance with an embodiment of the present invention.

Three types of model parameters are listed in the table for material dependent parameters, parameters associated with the external inputs to the breakdown process and computer simulation parameters. Voltage values above 5 kV were used for all simulation results. The supply frequency was fixed for the simulations at 60 Hz. The dielectric strength and relative permittivity for insulation materials can be obtained from manufacturers and for the material whose breakdown is modeled in the figures, was found to be 15.7 kV/mm and 4.8 respectively. The material hardness can be obtained from manufacturers and was fixed at 75. The material hardness guides the choice of critical damage energy that is used in the proposed model. The channel conductivity should be low values below 0.001 for good results. The remaining parameters are simulation parameters which affect the accuracy of numerical computations. Some of the figures generated with the model are illustrated with reference to FIGS. 4-7. The figures were generated to simulate the conditions of a needle plane experiment with the same separation distance of 0.1 mm. FIG. 4 illustrates an electrical tree simulation result utilizing the method of the present invention at 10 kV. FIG. 5 illustrates an electrical tree simulation result utilizing the method of the present invention at 20 kV. FIG. 6 illustrates an electrical tree simulation result utilizing the method of the present invention at 30 kV. FIG. 7 illustrates an electrical tree simulation result utilizing the method of the present invention at 40 kV. The fractal dimension 800 and the time to breakdown 810 are shown in FIG. 8 for each of FIGS. 4-7 generated by the model of the present invention. In a particular embodiment, the fractal dimension is calculated by the box counting method for a grid size of 0.01 mm. It is seen that there is a similar relationship between the time to breakdown and the applied voltage as between the fractal dimension and applied voltage. The relationship is, however, highly nonlinear.

A feature of the growth process is that the electrical tree has a critical length after which it breaks down. The dynamics of the tree growth before it achieves this critical length can be described as stable, while the growth after the critical length can be described as highly unstable, with the breakdown process resulting in the almost instantaneous channel elongation from the point of initiation to the ground plane. These characteristics initiated assessment of the chaotic tree growth resulting in a thermodynamic macro-model that uses the fractal dimension of the electrical tree, before it enters the final growth phase, to determine the time to breakdown of the tree. Equation (6) and the results presented in FIG. 8 show a fundamental relationship that relates some material properties and other parameters to the breakdown time. Based on this formulation, equation (7) is proposed as an empirical relationship that can be used to determine the time to breakdown of insulation materials.

$$t_g = \left(\frac{L_c}{L_b}\right)^{df} \left(\frac{hN_b}{kT}\right) \exp\left(\frac{U_0 - \alpha C_0 \pi \varepsilon E^2}{kT}\right) \quad (6)$$

$$t_g^1 = \alpha(D_s)^{df} \exp(D_m - \beta V_s^2) \quad (7)$$

Figure 9:
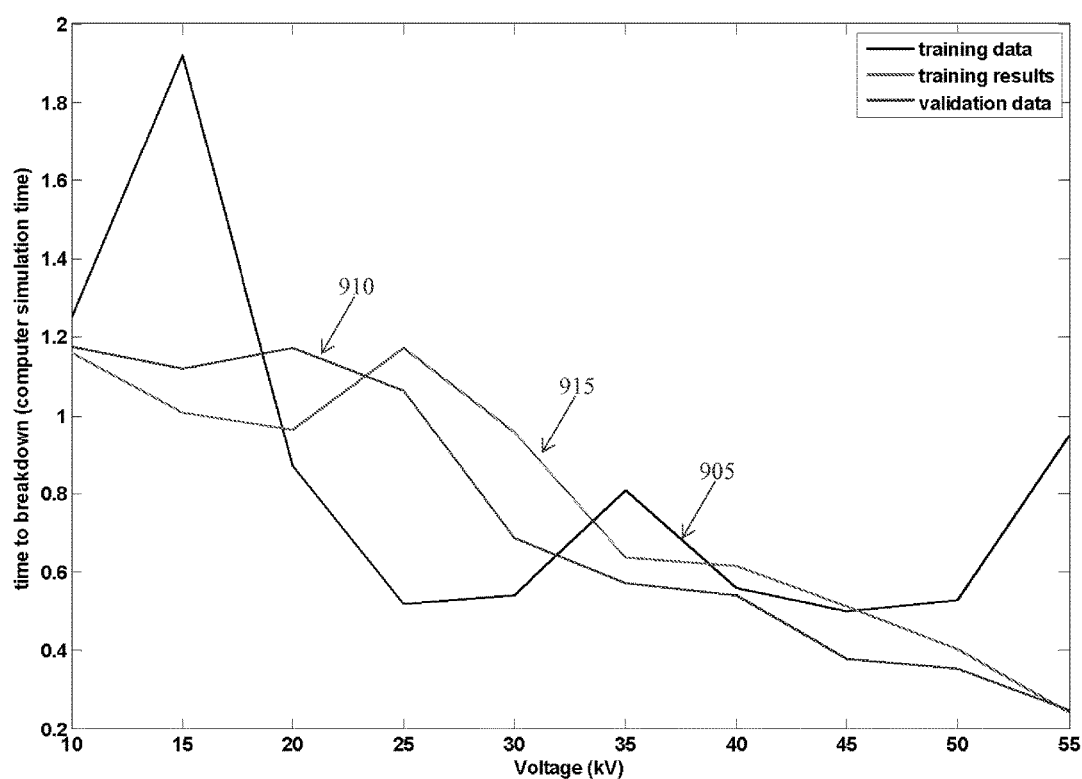
FIG. 9 is a plot of empirical curve fitting for simulation data based on the proposed electrical model in accordance with an embodiment of the present invention.

In equation (6), $U_0$ is the initial energy barrier for molecular breakdown of the bonds in the dielectric material, $\alpha C$ is the volume of material activated in the direction of the applied field, E is the local field strength dependent on the applied voltage, kT is the Boltzmann's constant, T is the temperature in Kelvins, $hN_b$ is the Planck constant multiplied by the number of bonds in a given tree branch, and $L_c/L_b$ is the ratio of critical length over which breakdown proceeds exponentially and the instantaneous length of the tree branch farthest away from the tree tip. Equation (7) is based on Equation (6) and is proposed as a model to determine the time-to-breakdown of a dielectric material undergoing breakdown. Equation (7), however, uses parameters that are more easily accessible by replacing the ($L_c/L_b$) term by the separation distance between the electrodes in a needle plane experiment, $D_s$. The second term is replaced with a constant $\alpha$, to be determined experimentally. Inside the exponential, the initial energy barrier is replaced by a parameter in the proposed electrical tree model, the critical damage energy, $D_m$. The local electrical field is replaced by the supply voltage, $V_s$, and a constant, $\beta$, to be determined experimentally. df is the fractal dimension whose value can only be determined after an examination of a failed tree. The proposed remaining useful life model can be determined by empirical curve fitting for any dielectric material. FIG. 9 illustrates the training data 905, validation data 910 and training results 915 as determined by the model of the present invention. FIG. 9 is the result of such curve fitting for simulation data based on the proposed electrical model. There is generally a closer fit for voltage values in the middle of the figure with a divergence on the extremes of voltages.

Figure 10:
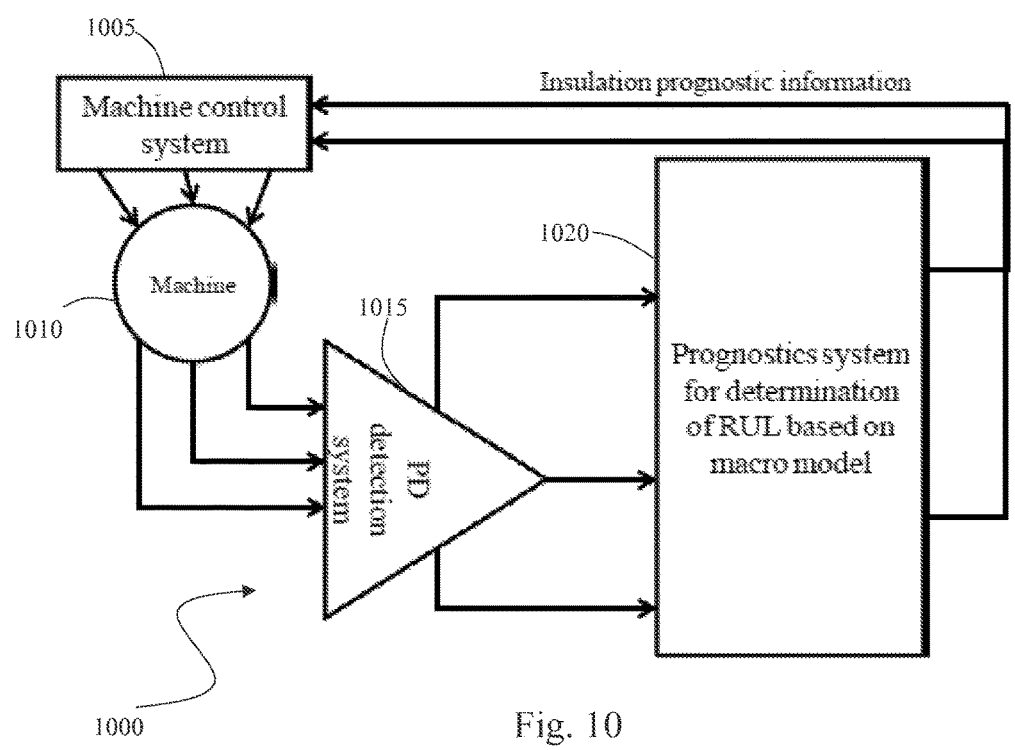
FIG. 10 is a diagram of a schematic of a fault prognostic system to determine the remaining useful life of an insulation system based on a macro-model, in accordance with an embodiment of the present invention.

FIG. 10 shows an inference system 1000 based on the above discussion that can be used for the determination of the remaining useful life of the insulation system of electrical machines. In this embodiment, the inference system 1000 includes a machine control system 1005 coupled to the machine 1020. The machine 1020 is coupled to a partial discharge detection system 1015 which provides partial discharge information to a prognostics system 1020 for the determination of the remaining useful life based on the macro model of the present invention. The prognostics system provides the insulation prognostic information to the machine control system 1005 to control the operation of the machine 1010. The inference engine 1000 is proposed as an artificial intelligence technique that is able to associate partial discharge characteristics with the characteristics of the growing tree. After, obtaining the fractal dimension of the tree using the inference system, the proposed macromodel of the electrical tree can be used to determine the remaining useful life of the insulation system. From the figures of the growing tree, it is seen that the fractal dimension can change over the course of growth of the electrical tree. The prognosis system, however, would provide a different estimate of the remaining useful life if the partial discharge characteristics change due to changing electrical tree characteristics.

Figure 11:
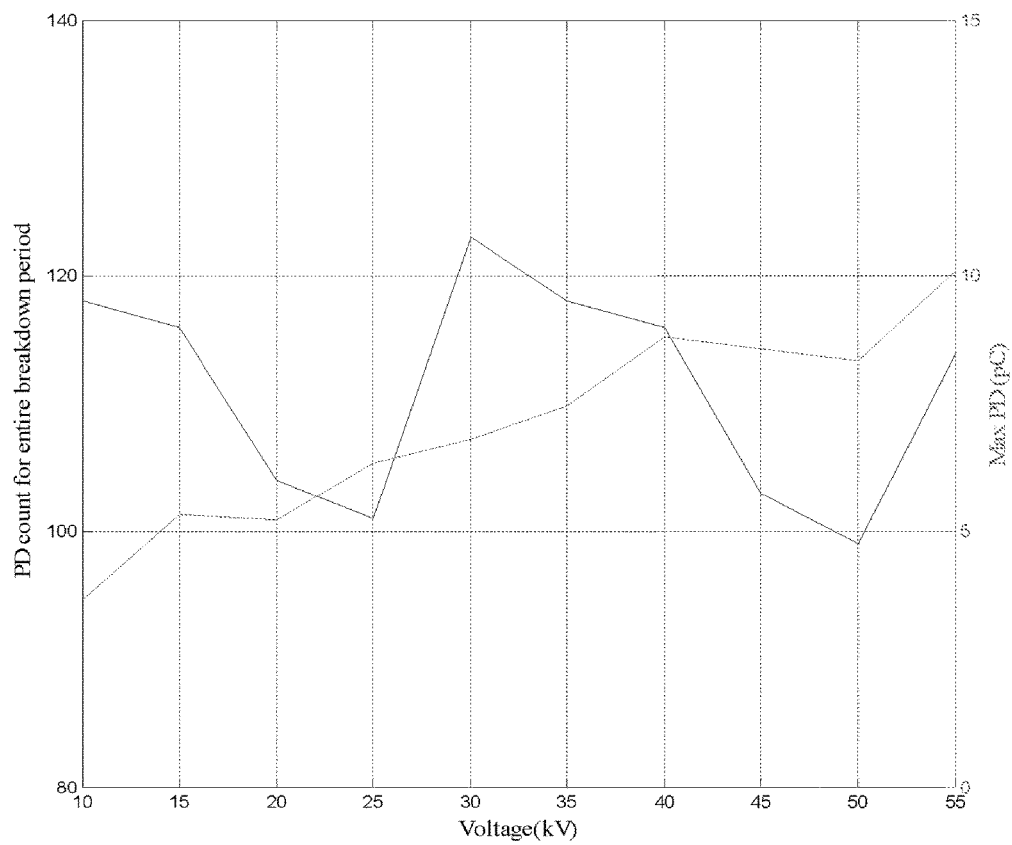
FIG. 11 is a plot of the relationships between the maximum partial discharge and the partial discharge count for the entire duration of breakdown as well as the supply voltage for computer simulation in accordance with an embodiment of the present invention.

FIG. 11 shows the relationships between the maximum partial discharge and the partial discharge count for the entire duration of the breakdown as well as the supply voltage for the computer simulation using the proposed model. It is seen that, with increasing applied voltage, the maximum measured partial discharge during tree growth increases, which is expected. The partial discharge count, however, has an interesting relationship which is confirmed experimentally from testing carried out during the experiment in dielectric breakdown mechanisms.

Figure 12:
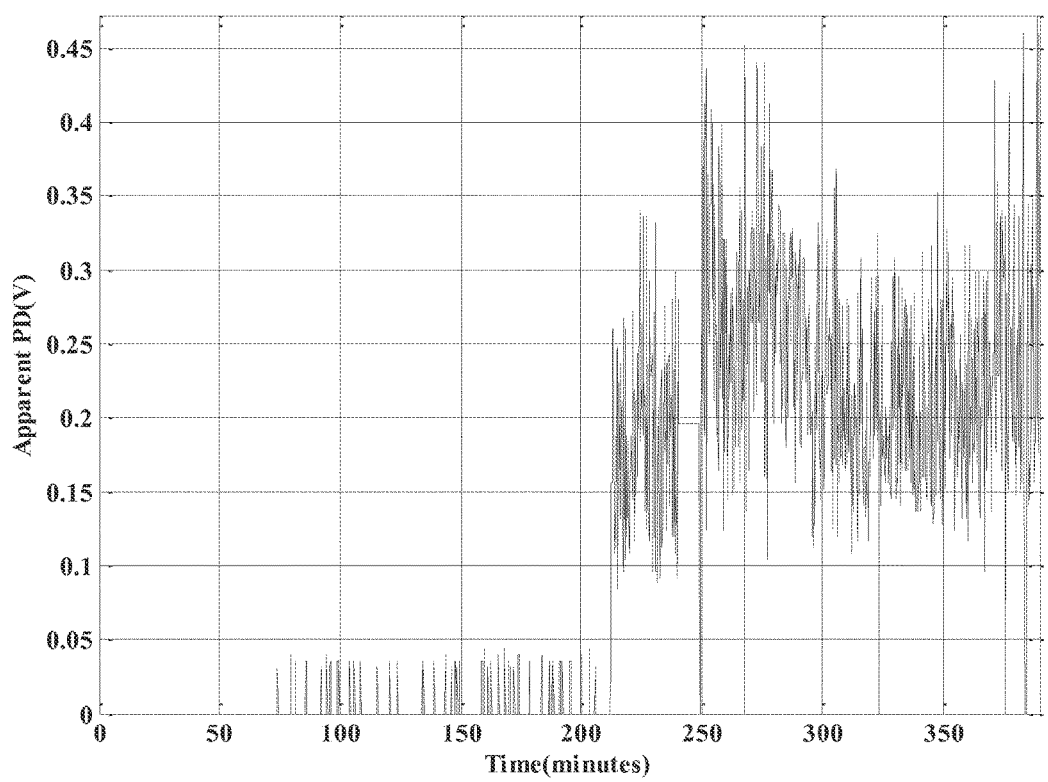
FIG. 12 is a plot of the maximum apparent charge per applied voltage cycle (60 Hz) for an entire tree propagation and complete breakdown at applied voltage of 8 kV in accordance with an embodiment of the present invention.
Figure 13:
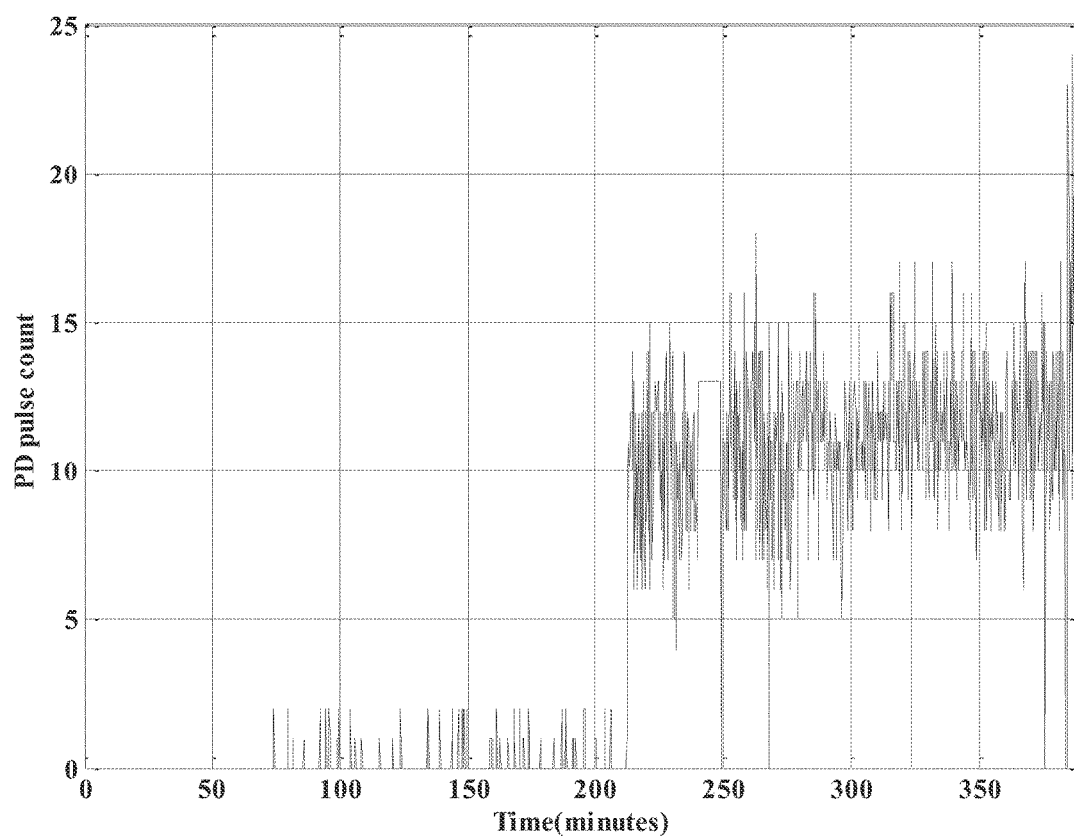
FIG. 13 is a plot of the PD count per cycle for the same period as FIG. 12 in accordance with an embodiment of the present invention.

Results of actual breakdown testing are shown in FIG. 12 and FIG. 13 for maximum apparent charge, measured in volts, and partial discharge count. The plot in FIG. 12 is for the maximum apparent charge per applied voltage cycle (60 Hz) for an entire tree propagation and complete breakdown at applied voltage of 8 kV. FIG. 11 is the partial discharge count per cycle for the same period as FIG. 12. These correlations are useful since the presented macro model and the relationship between partial discharge and voltage as shown, by way of computer simulation and experimental measurement, indicates a way to use partial discharge measurements to determine the remaining useful life of machine insulation systems.

The inference engine 1000 of FIG. 10 requires the fractal dimension of the tree which is only obtained after breakdown. Obtaining the fractal dimension is possible with an elaborate experimental setup which may not be practical for machine insulation systems. As such, the present invention establishes a means for using the modified thermodynamic model to predict the time to breakdown of the insulation system. The present invention uses the modified thermodynamic model together with information from the partial discharge events during the breakdown process to predict the time to breakdown of the insulation system.

Figure 14:
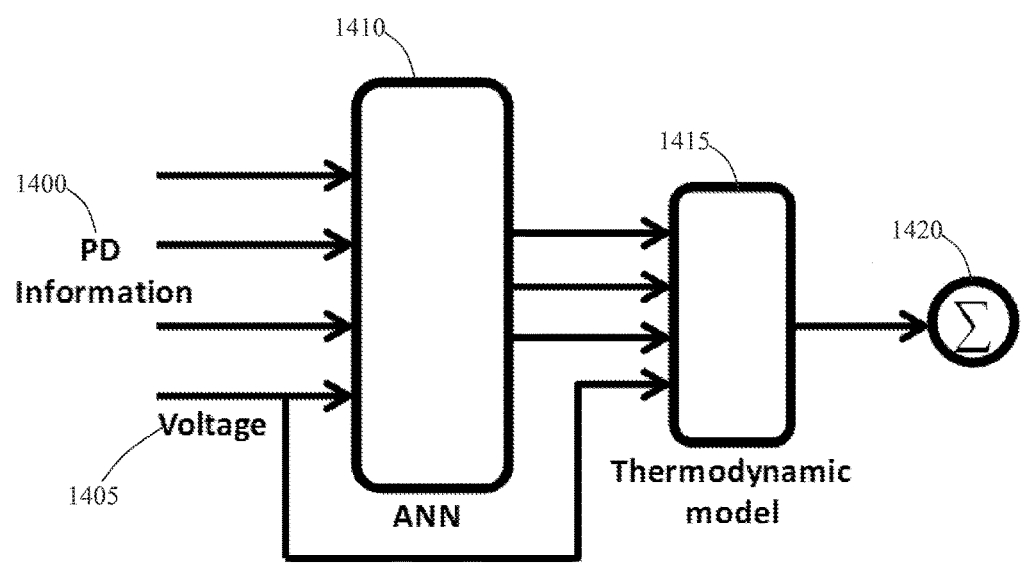
FIG. 14 diagrammatic view of a training model for an artificial neural network breakdown prognosis system in accordance with an embodiment of the present invention.

The foregoing discussion shows that an inference system can be developed to provide information about the condition of the dielectric material undergoing breakdown if partial discharge information can be obtained. As previously discussed, during tree propagation, the number of partial discharge pulses per cycle, the maximum partial discharge per cycle, the average partial discharge per cycle and the angle of the maximum partial discharge per cycle undergo changes that can be linked to the dynamics of tree growth. The idea is to obtain partial discharge data for a number of breakdown simulations carried out at different voltage levels. The partial discharge data obtained 1400, the voltage level 1405 and other aspects of the breakdown process can be associated with the time to breakdown 1420 of the specimen using an artificial neural network 1410, such as a multi-layer perceptron (MLP), and a thermodynamic model 1415 to assess the remaining useful life of the insulation system, as illustrated in FIG. 14. The partial discharge data 1400 can be fed into the inference system which would then provide ongoing diagnostic information that can be used to serve as prognosis of the condition of the dielectric material. To use modified thermodynamic model 1415 in a predictive manner, the artificial neural network 1410 can be trained by assuming that the thermodynamic model 1415 is the output layer of the artificial neural network 1410. Utilizing this configuration, the necessary equations for the back-propagation rule can be derived as the activation function for the output layer of the artificial neural network 1410. The terms in the modified thermodynamic model that were initially obtained by curve fitting can now be obtained by the BP algorithm or Extended Kalman Filter (EKF) algorithm using standard artificial neural network training methods. If the data presented to the artificial neural network 1000 is treated as time stamped, then the best approach to use is the EKF training method. The inputs to the multi-layer perceptron would be the partial discharge data as previously mentioned, together with the voltage level and the distance between the ground plane and the needle tip. After training the artificial neural network with data from a number of breakdown processes, the artificial neural network can enable a better prediction of the time to breakdown using the modified thermodynamic model.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Glossary of Claim Terms

Electrical Machine Insulation Systems: is a system designed to contain some amount of electric current to the electrical machine.

Electrical Tree: is an electrical pre-breakdown phenomenon in insulation usually in a path resembling the branches of a tree.

Partial Discharge: is a localized dielectric breakdown of a portion of an electrical insulation system.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed:
1. A method for simulation of an electrical tree representative of partial discharge events within an insulation system, the method comprising:
representing a potential electrical tree within an insulation system, the potential electrical tree comprising a plurality of charged spheres and a plurality of potential tree links between any two of the plurality of charged spheres;
applying a voltage to the insulation system at a tree inception point;
calculating an incremental damage energy across each of the plurality of potential tree links resulting from the application of the voltage to the insulation system;
accumulating the incremental damage energy across each of the plurality of potential tree links;

identifying a potential tree link of the plurality of potential tree links as a failed tree link if the accumulated incremental damage energy exceeds a critical damage energy level; and adding the failed tree link to the tree inception point to simulate the electrical tree.

2. The method of claim 1, further comprising calculating a partial discharge based at least in part on the accumulated damage energy.

3. The method of claim 1, wherein the plurality of charged spheres are interspersed within the insulation system.

4. The method of claim 1, wherein calculating an incremental damage energy across each of the plurality of potential tree links further comprises:

calculating a charge for each of the plurality of charged spheres resulting from the applied voltage;

calculating the electrical potential between any two of the plurality of charged spheres comprising a potential tree link based upon the calculated charge for each of the plurality of charged spheres; and calculating the incremental damage energy across each of the plurality of potential tree links based upon the calculated charge of the two charged spheres comprising the potential tree link.

5. The method of claim 1, further comprising identifying characteristic parameters of the insulation system.

6. A method for predicting a time-to-breakdown of an insulation system, the method comprising:

simulating an electrical tree representative of partial discharge events within the insulation system, wherein simulating the electrical tree comprises;

representing a potential electrical tree within an insulation system, the potential electrical tree comprising a plurality of charged spheres and a plurality of potential tree links between any two of the plurality of charged spheres;

applying a voltage to the insulation system at a tree inception point;

calculating an incremental damage energy across each of the plurality of potential tree links resulting from the application of the voltage to the insulation system;

accumulating the incremental damage energy across each of the plurality of potential tree links;

identifying a potential tree link of the plurality of potential tree links as a failed tree link if the accumulated incremental damage energy exceeds a critical damage energy level;

adding the failed tree link to the tree inception point to simulate the electrical tree;

calculating a partial discharge based at least in part on the accumulated damage energy;

obtaining a fractal dimension of the electrical tree; and predicting the time-to-breakdown of the insulation system based at least in part upon the fractal dimension of the electrical tree and calculated partial discharge.

7. The method of claim 6, wherein the plurality of charged spheres are interspersed within the insulation system.

8. The method of claim 6, wherein calculating an incremental damage energy across each of the plurality of potential tree links further comprises:

calculating a charge for each of the plurality of charged spheres resulting from the applied voltage;

calculating the electrical potential between any two of the plurality of charged spheres comprising a potential tree link based upon the calculated charge for each of the plurality of charged spheres; and calculating the incremental damage energy across each of the plurality of potential tree links based upon the calculated charge of the two charged spheres comprising the potential tree link.

9. The method of claim 6, further comprising identifying characteristic parameters of the insulation system.

10. A non-transitory computer-readable medium having computer-executable instructions for performing a method of running a software program on a computing device for the simulation of an electrical tree representative of partial discharge events within an insulation system, the computing device operating under an operating system, the method including issuing instructions from the software program comprising:

representing a potential electrical tree within an insulation system, the potential electrical tree comprising a plurality of charged spheres and a plurality of potential tree links between any two of the plurality of charged spheres;

applying a voltage to the insulation system at a tree inception point;

calculating an incremental damage energy across each of the plurality of potential tree links resulting from the application of the voltage to the insulation system;

accumulating the incremental damage energy across each of the plurality of potential tree links;

identifying a potential tree link of the plurality of potential tree links as a failed tree link if the accumulated incremental damage energy exceeds a critical damage energy level; and adding the failed tree link to the tree inception point to simulate the electrical tree.

11. The medium of claim 10, the method further including issuing instructions from the software program comprising calculating a partial discharge based at least in part on the accumulated damage energy.

12. The medium of claim 10, wherein the plurality of charged spheres are interspersed within the insulation system.

13. The medium of claim 10, wherein calculating an incremental damage energy across each of the plurality of potential tree links further comprises:

calculating a charge for each of the plurality of charged spheres resulting from the applied voltage;

calculating the electrical potential between any two of the plurality of charged spheres comprising a potential tree link based upon the calculated charge for each of the plurality of charged spheres; and calculating the incremental damage energy across each of the plurality of potential tree links based upon the calculated charge of the two charged spheres comprising the potential tree link.

14. The medium of claim 10, the method further including issuing instructions from the software program comprising, identifying characteristic parameters of the insulation system.

15. A non-transitory computer-readable medium having computer-executable instructions for performing a method of running a software program on a computing device for predicting a time-to-breakdown of an insulation system, the computing device operating under an operating system, the method including issuing instructions from the software program comprising:

simulating an electrical tree representative of partial discharge events within the insulation system, wherein simulating the electrical tree comprises;

representing a potential electrical tree within an insulation system, the potential electrical tree comprising a plurality of charged spheres and a plurality of potential tree links between any two of the plurality of charged spheres;

applying a voltage to the insulation system at a tree inception point;

calculating an incremental damage energy across each of the plurality of potential tree links resulting from the application of the voltage to the insulation system;

accumulating the incremental damage energy across each of the plurality of potential tree links;

identifying a potential tree link of the plurality of potential tree links as a failed tree link if the accumulated incremental damage energy exceeds a critical damage energy level;

adding the failed tree link to the tree inception point to simulate the electrical tree;

calculating a partial discharge based at least in part on the accumulated damage energy;

obtaining a fractal dimension of the electrical tree; and predicting the time-to-breakdown of the insulation system based at least in part upon the fractal dimension of the electrical tree and calculated partial discharge.

16. The medium of claim 15, wherein the plurality of charged spheres are interspersed within the insulation system.

17. The medium of claim 15, wherein calculating an incremental damage energy across each of the plurality of potential tree links further comprises:

calculating a charge for each of the plurality of charged spheres resulting from the applied voltage;

calculating the electrical potential between any two of the plurality of charged spheres comprising a potential tree link based upon the calculated charge for each of the plurality of charged spheres; and calculating the incremental damage energy across each of the plurality of potential tree links based upon the calculated charge of the two charged spheres comprising the potential tree link.

18. The medium of claim 15, the method further including issuing instructions from the software program comprising, identifying characteristic parameters of the insulation system.

19. A system for predicting a time-to-breakdown of an insulation system, the system comprising:

a first computing device comprising a processor configured to run a software program capable of simulating an electric tree representative of partial discharge events within the insulation system, wherein simulating the electric tree comprises the steps of:

representing a plurality of charged spheres and a plurality of potential tree links between any two of the plurality of charged spheres, applying a voltage to the plurality of charged spheres and the plurality of potential tree links at a tree inception point, calculating an incremental damage energy across each of the plurality of potential tree links resulting from the application of the voltage, accumulating the incremental damage energy across each of the plurality of potential tree links, identifying a potential tree link of the plurality of potential tree links as a failed tree link if the accumulated incremental damage energy exceeds a critical damage energy level, adding the failed tree link to the tree inception point;

calculating a partial discharge based at least in part on the accumulated damage energy and obtaining a fractal dimension of the electrical tree, and a second computing device comprising a processor configured to run a software program capable of performing the steps of:

receiving the calculated partial discharge from the first computing device, and predicting the time-to-breakdown of the insulation system based at least in part upon the fractal dimension of the electrical tree and calculated partial discharge.

20. The system of claim 19, wherein calculating an incremental damage energy across each of the plurality of potential tree links further comprises:

calculating a charge for each of the plurality of charged spheres resulting from the applied voltage;

calculating the electrical potential between any two of the plurality of charged spheres comprising a potential tree link based upon the calculated charge for each of the plurality of charged spheres; and calculating the incremental damage energy across each of the plurality of potential tree links based upon the calculated charge of the two charged spheres comprising the potential tree link.

* * * * *